US006531104B1

(12) United States Patent
Borio et al.

(10) Patent No.: US 6,531,104 B1
(45) Date of Patent: Mar. 11, 2003

(54) PROCESS FOR THE ABSORPTION OF SULFUR OXIDES AND THE PRODUCTION OF AMMONIUM SULFATE

(75) Inventors: Donald C. Borio, Knoxville, TN (US); David J. Muraskin, Knoxville, TN (US); Phillip C. Rader, Knoxville, TN (US); Mark A. Walters, Knoxville, TN (US)

(73) Assignee: Alstom (Schweiz) AG, Baden (CH)

( * ) Notice: Subject to any disclaimer, the term of this patent is extended or adjusted under 35 U.S.C. 154(b) by 0 days.

(21) Appl. No.: 09/717,724

(22) Filed: Nov. 21, 2000

(51) Int. Cl.[7] .............................................. B01D 53/50
(52) U.S. Cl. ............. 423/243.01; 423/237; 423/243.03; 423/243.06
(58) Field of Search .................. 423/243.06, 243.01, 423/243.03, 237; 95/57

(56) References Cited

U.S. PATENT DOCUMENTS

| | | | | |
|---|---|---|---|---|
| 3,723,595 A | * | 3/1973 | Spedden | 423/50 |
| 3,836,630 A | | 9/1974 | Noguchi et al. | 423/242 |
| 3,983,217 A | | 9/1976 | Muraki et al. | 423/242 |
| 4,690,807 A | | 9/1987 | Saleem | 423/242 |
| 5,362,458 A | | 11/1994 | Saleem et al. | 423/243.06 |
| 5,470,556 A | * | 11/1995 | Samish | 423/243.08 |

FOREIGN PATENT DOCUMENTS

| | | | | |
|---|---|---|---|---|
| JP | 51-103074 | * | 9/1976 | ............ 423/243.06 |
| JP | 54-126668 A | * | 10/1979 | |
| JP | 64-90018 A | * | 4/1989 | ............ 423/243.06 |
| JP | 11-147018 A | * | 6/1999 | |

OTHER PUBLICATIONS

Perry et al. (editors) Chemical Engineers' Handbook (5th ed.) McGraw–Hill Book Co. USA; 1SBN 0–07–049478–9 pp. 18–84 and 18–85, 1973.*

* cited by examiner

Primary Examiner—Stanley S. Silverman
Assistant Examiner—Timothy C Vanoy
(74) Attorney, Agent, or Firm—Alix, Yale & Ristas, LLP

(57) ABSTRACT

A flue gas mixture containing sulfur oxides is scrubbed in a countercurrent spray tower absorber with a spray of ammonium sulfate liquor and the scrubbed gas stream containing ammonia aerosols, sulfur trioxide aerosols and ammonia slip is passed to a wet electrostatic precipitator for the removal of the aerosols and slip. The ammonium sulfate liquor in the absorber system is passed into a separate reaction tank where ammonia and air are injected. The ammonia and sulfur oxides react in the separate reaction tank to form ammonium sulfite which is oxidized to the sulfate by the air. The gases and vapors from the separate reaction tank are separately scrubbed and the gases then returned to the absorber.

3 Claims, 1 Drawing Sheet

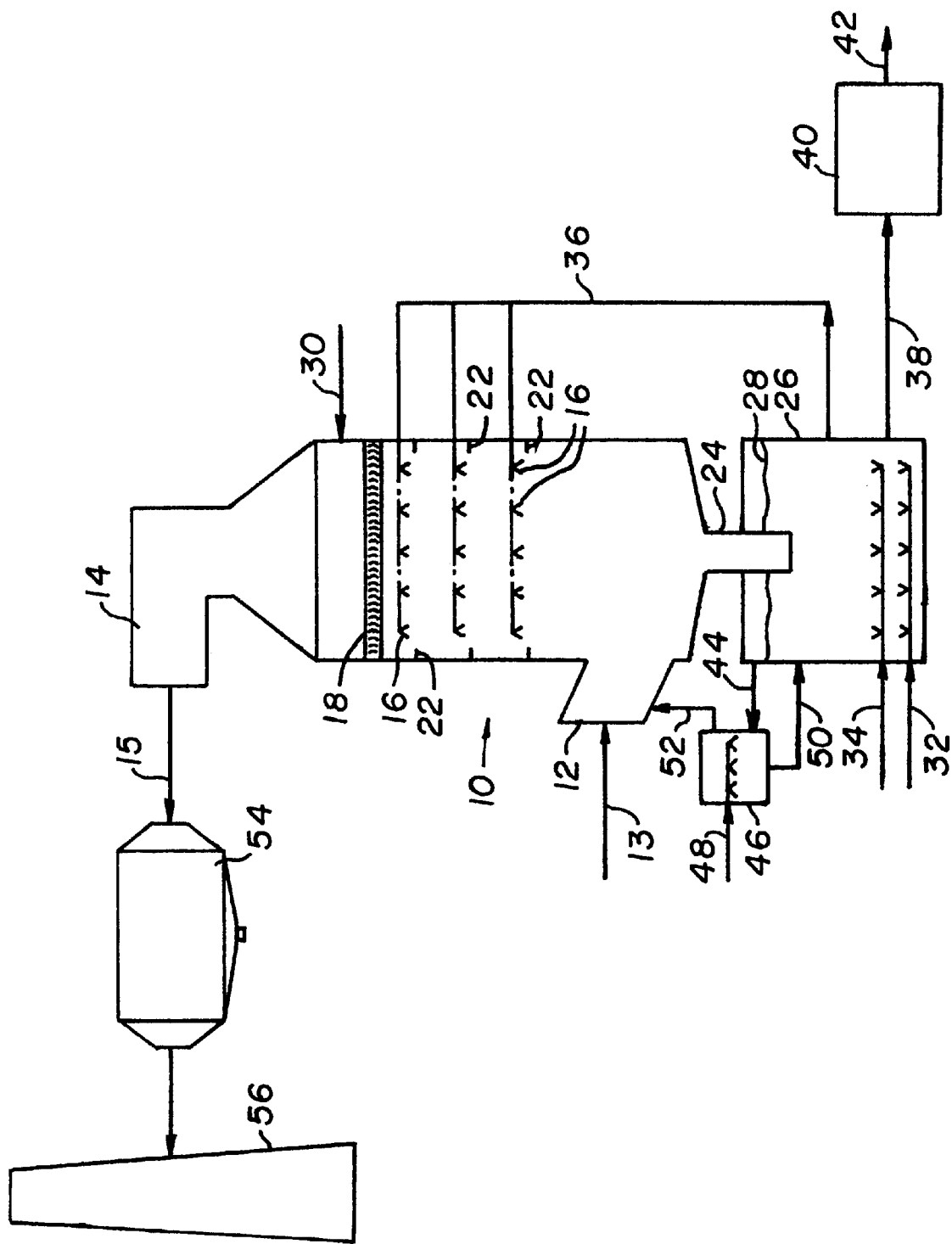

PROCESS FOR THE ABSORPTION OF SULFUR OXIDES AND THE PRODUCTION OF AMMONIUM SULFATE

BACKGROUND OF THE INVENTION

Coal and oil-fired boilers and the like can generate large quantities of sulfur oxides because of the significant quantities of sulfur usually contained within the fuels utilized by these devices. These sulfur oxides become entrained in the flue gases that are generated in the combustion process and are emitted to the atmosphere. Once air-borne, these contaminants react with the moisture in the atmosphere and produce what is commonly referred to as acid rain. Acid rain, which is sulfuric acid, is released from the atmosphere and falls back to the earth where it becomes entrained in the groundwater, streams, lakes, and other water reservoirs. Environmental legislation restricts the emission of these pollutants into the atmosphere because of the long-term health effects that have been linked to significant exposure to these contaminants.

Current state of the art technology, limestone based wet flue gas desulfurization, incorporates the use of a calcium-based reagent to neutralize the sulfur oxides. The calcium in the limestone reacts with the sulfur oxides and produces a calcium sulfate product, commonly known as gypsum. Typically, the gypsum byproduct is disposed of in a landfill, used as filler in concrete or used in the production of wallboard. Disposal in a landfill requires a large initial capital investment as well as significant resources to monitor and maintain the landfill throughout the life of the plant. The use of the gypsum as concrete filler or wallboard product requires a significant transportation cost to deliver the gypsum to the manufacturing facility. The negative aspects render these two alternatives economically unattractive as potential disposal solutions. Existing limestone based wet flue gas desulfurization technologies are expensive to operate and they create a solid waste disposal problem or a low value by-product. They also utilize slurry for scrubbing and are subject to the associated high maintenance costs and operational difficulties.

Reagents other than limestone have also been used in absorption processes to form byproducts with more economical utilization. Ammonia may be used as the reagent and the byproduct is ammonium sulfate. The reaction of ammonia, sulfur oxide and oxygen produces ammonium sulfate. The major use of ammonium sulfate is as a fertilizer, which accounts for approximately 95% of the domestic ammonium sulfate consumption. The advantage of using ammonium sulfate over other fertilizers is the presence of both nitrogen and sulfur, which is ideal for highly alkaline soils. Sulfur deficient soils are becoming more common because of larger crop yields removing increased amounts of sulfur, continued use of fertilizers which contain no sulfur, and reduced sulfur disposition from the atmosphere due to reduced sulfur emissions from coal and oil fired power plants. Sulfur is a valuable nutrient because it has been closely linked to nitrogen efficiency, it aids in the plant seed production process, and it supports the chlorophyll production process.

Although ammonia is a well-known reagent used in the wet fuel gas desulfurization process, the ammonia based aerosols generated in the sulfur oxide absorption process restrict the efficient operation of the many processes that are available. To achieve an efficiently operating ammonia based wet flue gas desulfurization system design, the pH of the ammonia based wet flue gas desulfurization system is critical. Higher pH values lead to increased sulfur oxide removal efficiency and thus, higher production rates of ammonium sulfate. However, operation at higher pH values results in higher ammonia vapor pressure. The ensuing gas phase ammonia reacts with gas phase hydrogen chloride and sulfur dioxide forming aerosols. The highly visible ammonia slip and aerosols are considered secondary pollution and produce a blue haze or plume at the discharge of the flue gas stack. The ammonia based aerosols are submicron in size and are difficult to remove in the sulfur dioxide absorption process. Gaseous ammonia at even low concentrations in the flue gas results in these visible plumes and increased plume opacity. Current ammonia based wet flue gas desulfurization technologies are vulnerable to these visible emissions which have adverse health effects.

Other problems encountered by existing ammonia based wet flue gas desulfurization technologies which employ prescrubber are due to crystallization of the ammonium sulfate product occurring in the prescrubber. Product contamination by fly ash and other impurities results from difficulties with product separation. Product purity decreases as a consequence. Another result of crystallization in a prescrubber is that scrubbing is accomplished with a slurry. Slurry based scrubbing leads to high maintenance costs and operational difficulties. Prescrubbers also result in a larger pressure drop for the waste gas through the ammonia based wet flue gas desulfurization system.

SUMMARY OF THE INVENTION

An object of the present invention is to provide an improved process and system for the absorption of sulfur oxides from flue gases and other sulfur oxide-containing gases. A specific object is the reduction of the emission of ammonia and sulfur compound aerosols. The invention particularly involves the scrubbing of the sulfur oxides from the gases with an ammonium sulfate liquor in a countercurrent spray tower absorber and passing the scrubbed gases to a wet electrostatic precipitator where ammonia aerosols, sulfur trioxide aerosols and ammonia slip are precipitated out of the scrubbed gases. In the preferred embodiment, the ammonium sulfate liquor with the absorbed sulfur oxides is passed from the spray tower into a separate reaction tank where ammonia and air are injected. The ammonia and sulfur oxides react to form ammonium sulfite which is oxidized to the sulfate by the oxygen in the injected air. The gases and vapors from the separate reaction tank are separately scrubbed before return of the gases to the absorber. The absorber construction with by-pass eliminating rings improves the sulfur oxide absorption and reduces aerosol formation and emission.

BRIEF DESCRIPTION OF THE DRAWING

The drawing is a process flow diagram of the ammonium sulfate gas desulfurization system also illustrating various details of the equipment.

DESCRIPTION OF THE PREFERRED EMBODIMENT

Referring to the drawing, 10 is a wet spray tower absorber having inlet 12 adjacent the bottom for the raw flue gas 13 outlet 14 for the cleaned gas 15 at the top. Located in the absorber 10 in the spray zone above the flue gas inlet 12 are a plurality of spray nozzles 16 for spraying aqueous ammonium sulfate liquor countercurrent to the flue gas stream traveling upward through the absorber. Above the spray zone is a mist eliminator 18 which may be any conventional design for the removal of droplets of ammonium sulfate liquor which have become entrained in the flue gas stream as it passes through the spray zone. These mist eliminators normally consist of vanes that provide surfaces for the impingement of the droplets which then coalesce and descend by gravity. However, mist eliminators are not effective in removing the ammonia/sulfur aerosols.

A uniform spray flux a cross the diameter of the spray zone of the absorber 10 is important for maximum performance. One way to ensure the uniform spray flux is to arrange the nozzles in overlapping circles and in multiple levels as shown in the drawing. A further feature for ensuring the uniform flux is by use of by-pass eliminating rings 22 which are annular performance enhancement plates attached to the inside wall of the absorber 10, preferably at or near at each spray level. Between the spray nozzles and the wall of the absorber, the amount of sprayed ammonium sulfate liquor is less than in the interior of the absorber. Therefore, spray flux will be less between the nozzles and the wall resulting in reduced sulfur oxide removal. Gas, which passes through this low-flux perimeter zone, will have higher concentrations of sulfur dioxide as the gas travels upward in the absorber and contacts the fresh liquor sprayed from the nozzles. Waste gas with higher concentrations of sulfur dioxide contacting fresh liquor with potentially high ammonia vapor pressure can cause formation of aerosols. These rings 22 reduce this high rate of gas flow upward around the inside perimeter of the absorber.

The sulfur oxides contained in the waste gas are absorbed into the aqueous ammonium sulfate liquor sprayed from the nozzles 16. Absorbed sulfur dioxide reacts with dissolved ammonia in the ammonium sulfate liquor to form dissolved ammonium sulfite. In the bottom of the absorber 10 is an outlet 24 which is the exit for the ammonium sulfate liquor which has now absorbed the sulfur oxides and contains ammonium sulfite. This outlet 24 feeds directly into the reaction tank 26 which is a closed vessel. The outlet 24 extends below the surface 28 of the ammonium sulfate liquor in the reaction tank 26 which prevents the escape of vapors and particularly aerosols back up into the absorber. The ammonium sulfate liquor contained in the reaction tank 26 has an ammonium sulfate concentration which is less than the solubility limit of the ammonium sulfate and is a clear scrubbing solution which avoids slurry-related problems. The reaction tank 26 provides the necessary liquid hold-up and make-up water is added to the spray tower 10 at 30 to maintain the proper concentration and level for the liquor in the reaction tank 26.

The liquor in the reaction tank 26 is injected with an oxygen-containing gas 32, either air or oxygen, and anhydrous or aqueous ammonia vapor 34. Injection may be accomplished by various methods such as by sparge grids located near the bottom of the reaction tank. The ammonia is metered into the reaction tank to maintain a desired pH level and in response to the sulfur dioxide loading of the inlet waste gas. The dissolution of the ammonia vapor occurs immediately. It is this dissolved ammonia which reacts with the sulfur dioxide in the absorber and forms the ammonium sulfite. The oxygen that is injected into the reaction tank 26 converts the ammonium sulfite to ammonium sulfate. The ammonium sulfate from the reaction tank 26 with the dissolved ammonia is pumped through line 36 up to the spray nozzles 16.

Excess ammonium sulfate liquor is periodically or continuously bled from the reaction tank 26 through line 38. The removed ammonium sulfate liquor may be directly sold as product or it may be processed in the evaporation/crystallization system 40 to form a solid product 42. Since the crystallization is separate from the absorption, impurities may be removed, such as by filtration, before the crystallization occurs. Water vapor that is produced during the evaporation is condensed and returned to the absorber.

In the present invention, the reaction tank gases and vapors are physically separated from the absorber and the flue gas. These gases and vapors are prevented from entering the absorber by the liquid seal that is formed by the outlet pipe or conduit 24 extending below the surface 28 of the ammonium sulfate liquor in the reaction tank 26. This physical separation is a feature of the invention which further reduces the formation of ammonia aerosols by preventing contact between the waste gas containing the sulfur oxides and the ammonia slip emitted from the surface of the ammonium sulfate liquor in the reaction tank. These vapors and gases 44 containing excess oxidation air and ammonia are vented from the closed reaction tank 26 to the vapor scrubber 46 which utilizes spray water 48 to absorb the vapors and particularly the ammonia. The water from the vapor scrubber 46 with the absorbed vapors is returned to the reaction tank 26 through line 50. The remaining gases from the vapor scrubber 46 are vented to the absorber inlet through line 52. This process of the invention permits operation at high ammonia concentrations and high pH and ammonia vapor pressure levels and at the same time reducing the carry over of ammonia aerosols from the scrubber.

In the present invention, the crystallization and growth of crystals is in the reaction tank and is separate from the absorption process. This separation eliminates the need for prescrubbers which are used in some other systems. The result is less pressure drop and clear scrubbing liquor that minimizes slurry-related problems. The separate crystallization process also permits control of process variables affecting crystal growth and size. Another advantage is that impurities such as fly ash may be filtered prior to crystallization, resulting in greater product purity. Additionally, troubleshooting and repair of equipment associated with crystallization and size of the ammonium sulfate product is independent of other equipment. Overall power generation equipment availability is not affected by the availability of the crystallization process.

The separate crystallization process also eliminates the need for a chloride blowdown stream. Chlorides are present in many waste gases, and circulation of the ammonium sulfate liquor results in an accumulation of chlorides. Other processes purge chlorides from the ammonium sulfate liquor to waste treatment for disposal. In the present invention, ammonium chloride as well as ammonium sulfate crystallizes in the reaction tank and is removed along with the product.

Although the scrubbing and absorbing process of the present invention reduces the carry over of ammonia aerosols form the scrubber, the complete elimination of these aerosols and the sulfur trioxide aerosols and ammonia slip cannot be assured and may not be possible. Therefore, the present invention further involves passing the scrubbed gas 15 from the absorber 10 to a wet electrostatic precipitator 54 located after the absorber and before the stack 56. Wet electrostatic precipitators are known, commercially available types of electrostatic precipitators which are capable of and designed to handle the precipitation of wet droplets such as aerosols or mists from a gas stream. This step reduces the stack opacity to acceptable levels. As a result, the circulating liquor in the absorber can be operated at a higher pH to improve the sulfur oxide removal efficiency without increasing the aerosol discharge to the atmosphere.

What is claimed is:

1. A process for treating a gas containing sulfur oxides for the removal of said sulfur oxides comprising the steps of:
   (a) passing said gas containing said sulfur oxides upwardly in an absorber through a spray of aqueous ammonium sulfate solution passing downwardly in said absorber thereby forming a cleaned gas stream and an aqueous ammonium sulfate solution containing dissolved sulfur oxides;
   (b) conducting said aqueous ammonium sulfate solution containing dissolved sulfur oxides out from said absorber as it is formed;
   (c) collecting said aqueous ammonium sulfate solution containing dissolved sulfur oxide in a closed reaction tank;
   (d) introducing ammonia and an oxygen-containing gas into said aqueous ammonium sulfate solution in said closed reaction tank whereby said dissolved sulfur oxides react with said ammonia and oxygen to form ammonium sulfate and whereby a gaseous mixture containing ammonia is formed in said closed reaction tank;
   (e) withdrawing a first portion of said aqueous ammonium sulfate solution from said reaction tank and forming said spray of aqueous ammonium sulfate solution therefrom and withdrawing a second portion as ammonium sulfate product;
   (f) scrubbing said gaseous mixture containing ammonia from said reaction tank with water thereby removing ammonia from said gaseous mixture and forming an aqueous scrubber effluent containing dissolved ammonia and a remaining gaseous mixture;
   (g) introducing said aqueous scrubber effluent containing dissolved ammonia back into said reaction tank; and
   (h) introducing said remaining gaseous mixture into said absorber.

2. A process as recited in claim 1 and further including the step of passing said cleaned gas stream to a wet electrostatic precipitator.

3. A process as recited in claim 1 wherein said absorber contains by-pass eliminator rings around the interior wall thereof which reduce the rate of the flow of said gaseous mixture upwardly along said interior wall.

* * * * *